United States Patent

[11] 3,622,240

| [72] | Inventor | Hinsdale Smith, Jr. Suffield, Conn. |
| [21] | Appl. No. | 849,986 |
| [22] | Filed | Aug. 14, 1969 |
| [45] | Patented | Nov. 23, 1971 |
| [73] | Assignee | Nikor Products Co., Inc. West Springfield, Mass. |

[54] PHOTOGRAPHIC ENLARGING EASEL
1 Claim, 7 Drawing Figs.

[52] U.S. Cl. ............................................. 355/74, 108/9
[51] Int. Cl. ...................................... G03b 27/58
[50] Field of Search .................................. 355/72, 74, 95, 125, 126; 248/454, 455; 108/9

[56] References Cited
UNITED STATES PATENTS

| 2,199,304 | 4/1940 | Dewey | 355/74 |
| 2,223,264 | 11/1940 | Moore | 355/74 |
| 2,244,036 | 6/1941 | Williman | 108/9 |
| 2,256,894 | 9/1941 | Chadkin | 355/74 |
| 2,369,897 | 2/1945 | Hjort | 355/74 X |
| 2,458,648 | 1/1949 | Saunders | 355/74 |
| 2,844,908 | 7/1958 | Moore | 108/9 |
| 2,972,207 | 2/1961 | Hiers | 108/9 X |
| 3,273,452 | 9/1966 | Saunders | 355/74 |

Primary Examiner—Samuel S. Matthews
Assistant Examiner—Monroe H. Hayes
Attorneys—Kenwood Ross and Chester E. Flavin ABSTRACT: A photographic enlarging easel has a base which has an open frame pivoted thereto, the frame having pairs of intersecting masking bands slidably related thereto. The masking bands are each moved by rotating a pinion which meshes with a rack on the frame. A paper stop is slidably related to the base and is moved by rotating a pinion which meshes with a rack on the base. A spring-loaded telescopic frame elevating assembly pivotally connects between the base and frame for holding the frame in a desired raised position.

INVENTOR.
HINSDALE SMITH, JR.
BY Kenwood Ross &
Chester E. Flavin
ATTORNEYS.

PHOTOGRAPHIC ENLARGING EASEL

SUMMARY OF THE INVENTION

The invention provides means for accurately and positively locating masking bands relative to a frame and a paper stop relative to a base in a photographic enlarging easel.

It envisions a pinion rotatably mounted on the masking bands and meshing with racks carried by the frame for effecting accurate and positive movement, with a similar rack and pinion arrangement being provided between the paper stop and the base.

It provides means for holding the rack in partially raised or fully raised position relative to the base.

DESCRIPTION OF THE PREFERRED EMBODIMENT

Figure 1:
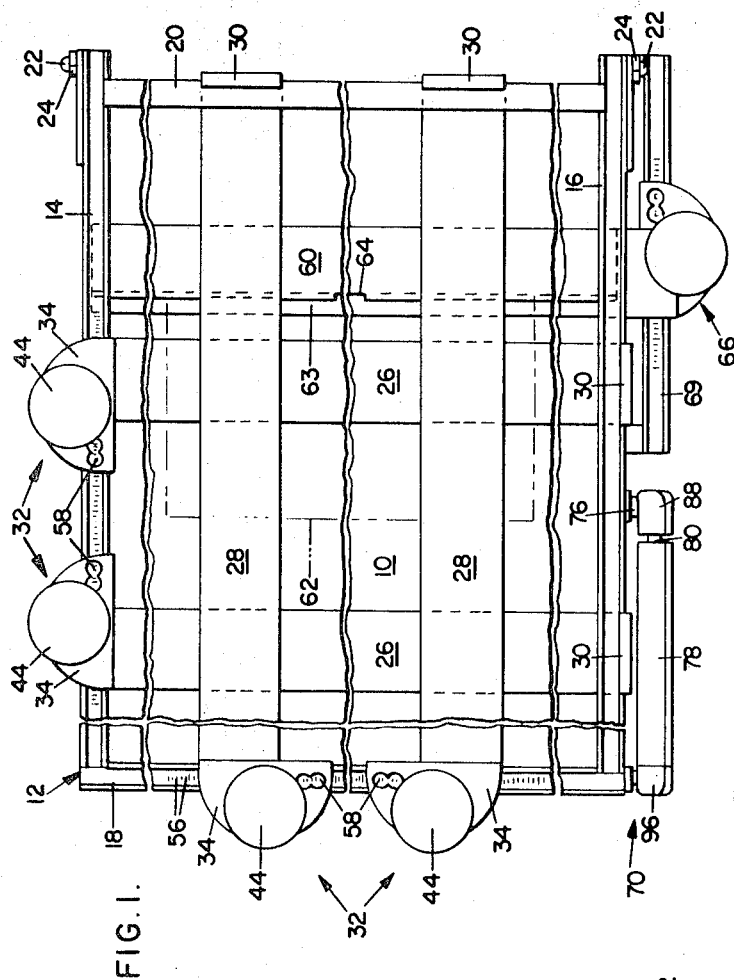
FIG. 1 is a broken view, in top plan, of a photographic enlarging easel embodying the invention.
Figure 3:
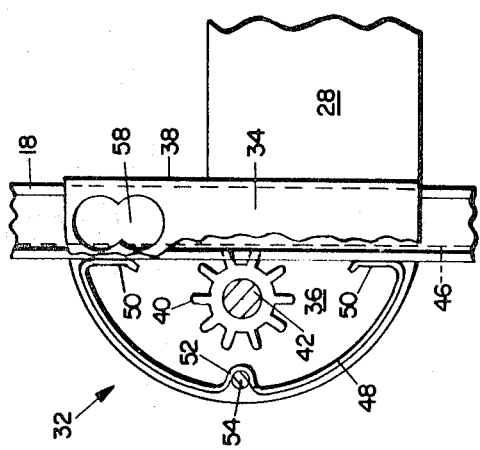
FIG. 3 is an enlarged, fragmentary view, in top plan, of one of the masking band motivating means.
Figure 2:
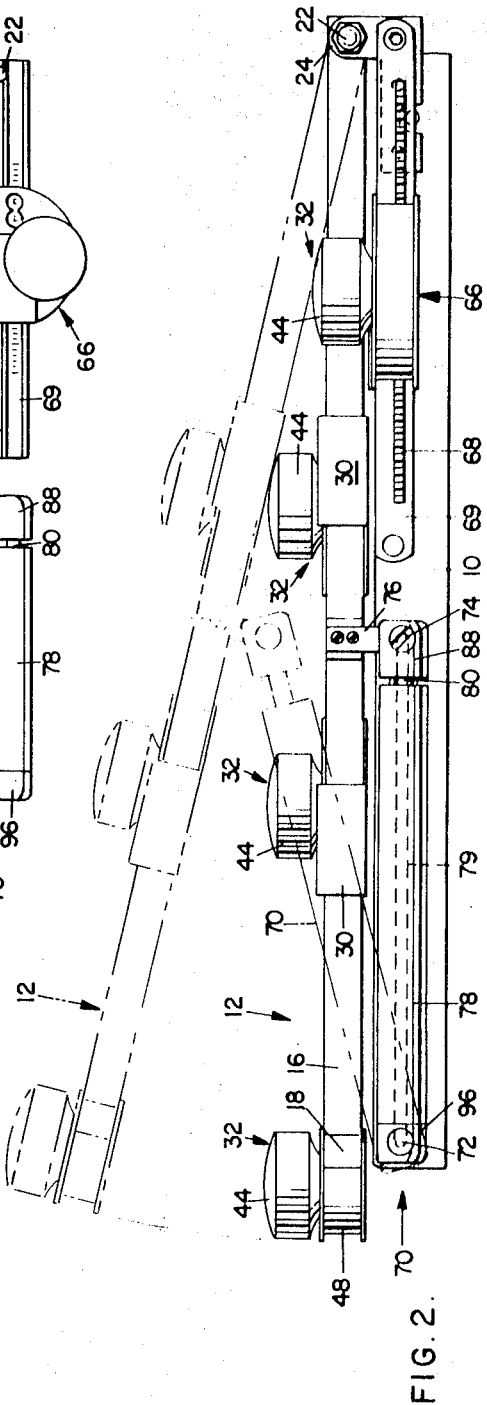
FIG. 2 is an enlarged view, in side elevation.
Figure 4:
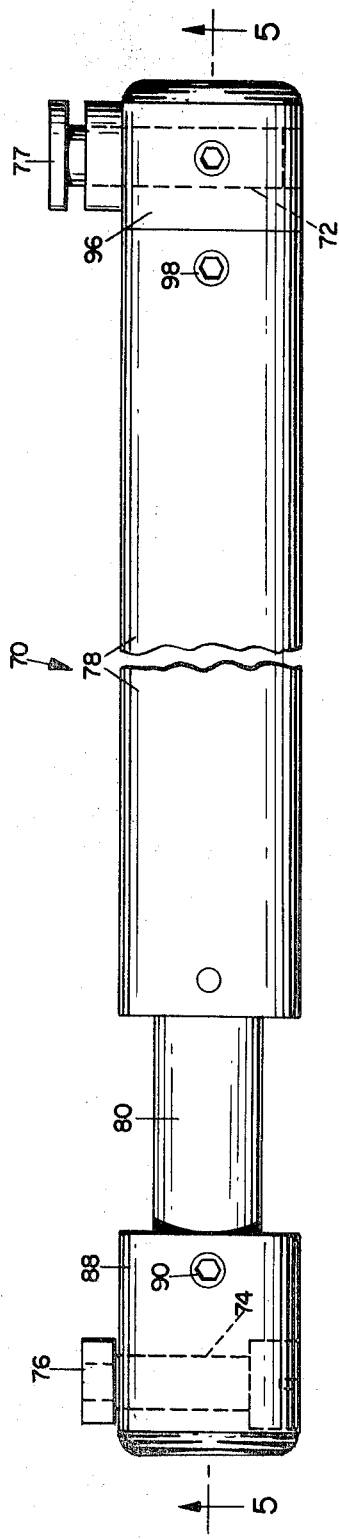
FIG. 4 is an enlarged, broken view, in top plan of one of the frame elevating assemblies.
Figure 5:
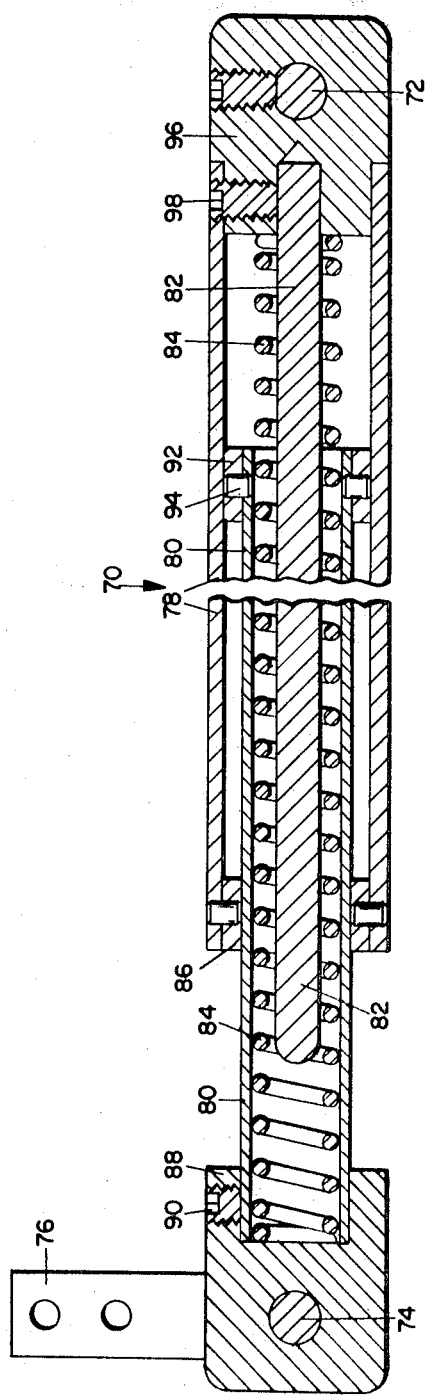
FIG. 5 is a cross-sectional view on line 5—5 of FIG. 4.

The easel comprises a generally rectangular base 10 having an open frame, generally indicated by 12, of like dimensions, pivotally connected to one edge thereof for swinging movements relative thereto. Frame 12 includes spaced parallel side rails 14 and 16 interconnected at their opposite ends by spaced parallel end rails 18 and 20 and is pivoted to the base as by pivot pins 22 which connect the side rails of the frame to respective brackets 24 extending upwardly from the respective side walls of the base adjacent one end thereof.

A pair of spaced, parallel masking bands 26 and 26 extend transversely between side rails 14 and 16 and a pair of spaced, parallel masking bands 28 and 28, disposed normal to bands 26, extend longitudinally between end rails 18 and 20, the pairs of bands 26 intersecting the pairs of bands 28, as is known.

Each of the bands and their motivating means are identical wherefore only one is now described.

Each band is provided at one end with an upturned and inturned end flange 30, which end flange loosely grips and overlies the adjacent side or end rail of the frame, and its opposite end, each band is fixed to a motivating means, generally indicated by 32, for effecting a linear movement thereof relative to the frame, the motivating means extending outwardly from the respective adjacent side or end rail.

Each motivating means 32 comprehends a housing defined by substantially semicircular spaced upper and lower walls 34 and 36 respectively extending horizontally outwardly from the adjacent rail and a vertical inner wall 38 embracing the inner face of the rail and interconnecting the upper and lower housing walls.

A pinion 40 is sleeved on a vertically extending shaft 42 journaled in upper and lower housing walls 34 and 36, the shaft having a manually engageable operating knob 44 fixed to its outer free end. Pinion 40 meshes with a rack 46 provided on the adjacent side or end rails.

A semicircular leaf spring 48 has a pair of intured ends 50 which bear against the rail with the spring, at its curved portion, being indented, as at 52, partially to encompass an upright post 54 extending between the upper and lower housing walls, by which arrangement, the leaf spring serves to bias the pinion into meshing engagement with its cooperant rack.

Manual rotation of knob 44 achieves linear movement of the housing and the masking band relative to the rail.

Each of the rails 14 and 18 may be optionally have a scale 56 delineated upon its upper face and sight openings 58 may be provided in upper housing wall 34 of the motivating means.

A stop or paper holder 60 is provided, against which the end of a sheet of photographic paper 62 may be abutted so that the paper may be properly positioned relative to the easel. The stop is in the form of a metal band, is similar to masking bands 26 and 28, is slidably related to the base and has a downturned flange (not shown) at one end for embracing one side wall of the base and an open throat 63 along one side edge thereof for the receipt therein of the leading edge of the paper. A sight notch 64 may serve for a visual inspection to ensure that the paper is fully entered with respect to the stop or paper holder.

Motivating means, generally indicated by 66, is identical to motivating means 32 in detail, and serves to effect longitudinal movement of stop 60, with a pinion of such motivating means (not shown) meshing with a rack 68 provided on a rail 69 fixed to a side wall of the base. Movement of the stop is effected by rotation of its knob 44.

A spring-loaded telescopic frame elevating assembly, generally indicated by 70, is disposed at the end of the easel removed from pivot pins 22 and serves to hold the frame in elevated position, when raised. This assembly is pivoted at one end, as at 72, to a side wall of base 10 and is pivoted at its opposite end, as at 74, to a bracket 76 depending from side rail 16 of frame 12. A head 77 on the inner end of pivot 72 is receivable in a horizontally extending slot 79 in the side wall of base 10 wherefore the lower end of assembly 70 is not only rotatable relative to but also slidable relative to, the base.

The frame elevating assembly includes an outer tube 78 concentrically related to an inner tube 80 which sleeves a guide rod 82 having a compression spring 84 circumposed thereon.

Inner tube 80 extends outwardly of the outer tube through an end bushing 86 on the end of the outer tube and is capped at its outer free end by an end cap 88 in which pivot 74 is journaled. A set screw 90, threaded in the end cap, bears against inner tube 80 to lock the cap to the tube.

A collar 92 is fixed to the opposite inner end of the inner tube, as by pins 94, and is slidably related to the outer tube.

An outer tube cap 96, in which pivot 72 is journaled is fixed to the outer end of outer tube 78 by a set screw 98 threaded in the outer tube and end cap and having an inner end bearing on the end of guide rod 82 which is disposed in the end cap.

Compression spring 84 us confined at its opposite ends by the end caps and is sleeved for the major portion of its length on guide rod 82.

Figure 6:
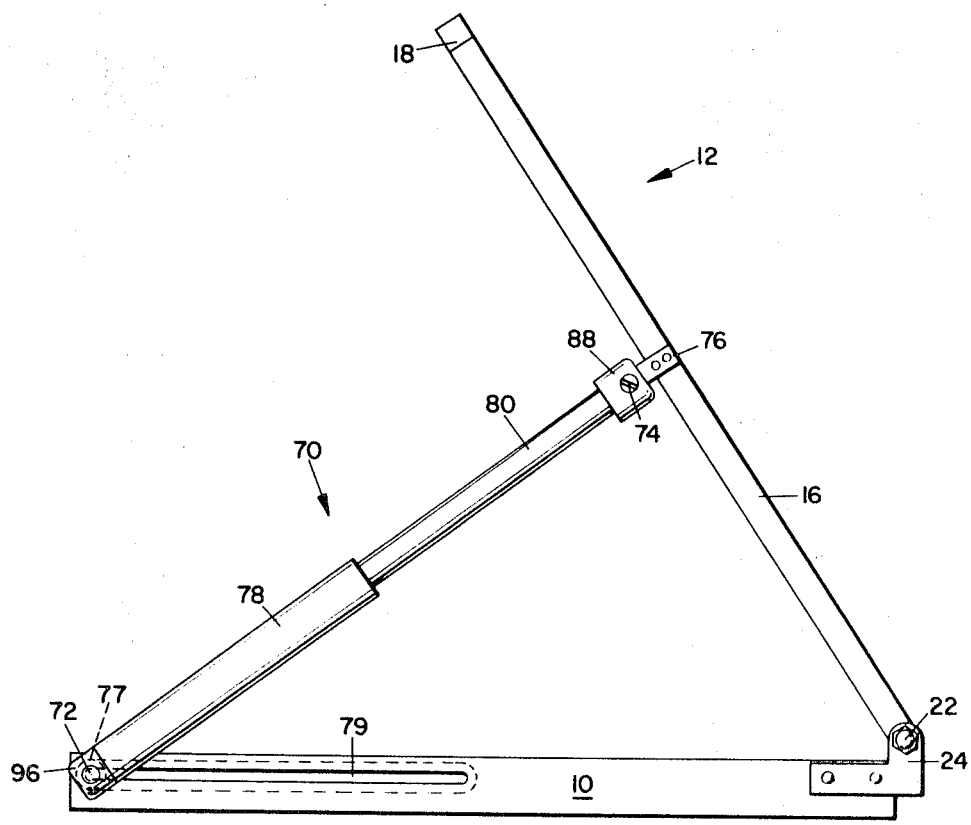
FIG. 6 is a side elevational view of the easel, with parts omitted for clarity, the frame thereof being shown in partially raised position.

The frame elevating assembly will hold the frame in a partially raised position, such as shown in FIG. 6, permitting access to the base and, since it is spring-loaded, will preclude the frame from closing accidentally or from being slammed down, when it is closed.

Figure 7:
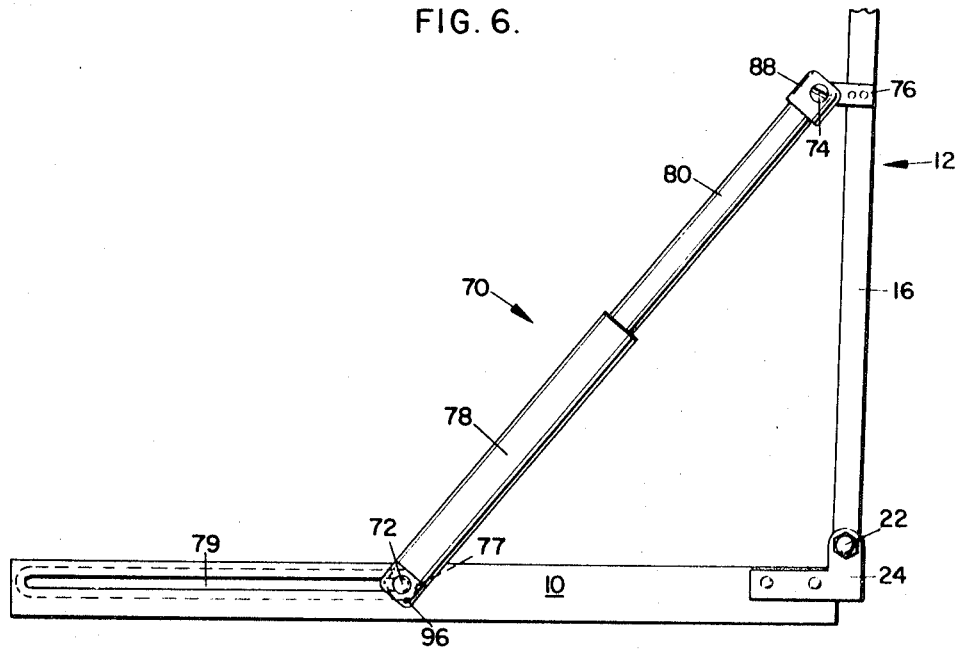
FIG. 7 is a fragmentary, side elevational view similar to FIG. 6, the frame thereof being shown in fully raised position.

Should it be desired to move the frame to the fully raised position, the lower end of the frame elevating assembly is slid along and relative to slot 79 of base 10 as the frame is pivoted relative to bracket 24 and raised to the position shown in FIG. 7 wherein it is tilted slightly to the rear so that it need not be held by the hands. This feature is especially advantageous, when it is desired to use the easel with an enlarger without employing the frame and masking bands.

What I claim:

1. A photographic enlarging easel comprising, a base, and open frame pivoted to the base, pairs of intersecting masking bands slidably related to the frame, and motivating means for moving each of the bands comprising, a rack on the frame, a pinion journaled relative to the band and meshing with the rack and handle means for rotating the pinion, a stop comprising a band slidably related to and extending across the base and having a continuous open throat along an edge thereof for the receipt therein of the leading edge of photographic paper, motivating means for moving the stop comprising, a rack on the base, a pinion journaled relative to the stop and meshing with the rack and handle means for rotating the pinion, and a spring-loaded telescopic frame elevating assembly pivotally connecting between the base and the frame for holding the frame in partially raised position, and being slidable relative to the base for holding the frame in fully raised position.

* * * * *